US012332706B2

(12) United States Patent
Gao et al.

(10) Patent No.: US 12,332,706 B2
(45) Date of Patent: Jun. 17, 2025

(54) RESONANT TANK CIRCUIT, WIDE VOLTAGE INPUT/OUTPUT POWER SUPPLY, AND ELECTRONIC DEVICE

(71) Applicant: SHENZHEN MICROBT ELECTRONICS TECHNOLOGY CO., LTD., Guangdong (CN)

(72) Inventors: Yang Gao, Guangdong (CN); Yuefeng Wu, Guangdong (CN); Jianli Wei, Guangdong (CN); Zuoxing Yang, Guangdong (CN)

(73) Assignee: SHENZHEN MICROBT ELECTRONICS TECHNOLOGY CO., LTD., Shenzhen (CN)

( * ) Notice: Subject to any disclaimer, the term of this patent is extended or adjusted under 35 U.S.C. 154(b) by 171 days.

(21) Appl. No.: 18/005,310

(22) PCT Filed: Jun. 8, 2021

(86) PCT No.: PCT/CN2021/098828
§ 371 (c)(1),
(2) Date: Jan. 12, 2023

(87) PCT Pub. No.: WO2022/127049
PCT Pub. Date: Jun. 23, 2022

(65) Prior Publication Data
US 2023/0283172 A1 Sep. 7, 2023

(30) Foreign Application Priority Data

Dec. 17, 2020 (CN) .......................... 202011496918.1

(51) Int. Cl.
*G06F 1/26* (2006.01)
*H02M 1/42* (2007.01)
(Continued)

(52) U.S. Cl.
CPC ................ *G06F 1/26* (2013.01); *G06F 1/266* (2013.01); *H02M 1/4241* (2013.01); *H02M 3/01* (2021.05); *H02M 3/33576* (2013.01)

(58) Field of Classification Search
CPC ............... H02M 1/4241; H02M 1/088; H02M 3/33576; H02M 3/01; G06F 1/26
See application file for complete search history.

(56) References Cited

U.S. PATENT DOCUMENTS 7,729,135 B1 * 6/2010 Schimel ............ H02M 3/33507
363/21.01
9,568,937 B1 * 2/2017 Brooks .................... H01F 29/02
(Continued)

FOREIGN PATENT DOCUMENTS

CN 101615856 A 12/2009
CN 101919147 A 12/2010
(Continued)

OTHER PUBLICATIONS

International Search Report and Written Opinion mailed Aug. 16, 2021 in International Application No. PCT/CN2021/098828.

Primary Examiner — Gary L Laxton
(74) Attorney, Agent, or Firm — Dickinson Wright PLLC

(57) ABSTRACT

A resonant tank circuit includes: a number-of-turns variable transformer unit, having an input end coil and an output end coil, the input end coil including at least two first connection ends and a second connection end, where a number of coil turns between each of the first connection ends and the second connection end is not equal; a switch switching unit, having a control end, a first input end, and at least two first output ends, where a quantity of the first output ends is equal to a quantity of the first connection ends, the first output ends are electrically connected to the first connection ends in a one-to-one manner, and the switch switching unit is configured to turn on a circuit connection between the first input
(Continued)

end and one of the at least two first output ends according to a control signal received by the control end.

5 Claims, 3 Drawing Sheets

(51) Int. Cl.
*H02M 3/00* (2006.01)
*H02M 3/335* (2006.01)

(56) References Cited

U.S. PATENT DOCUMENTS

| | | | |
|---|---|---|---|
| 2017/0077821 | A1 | 3/2017 | Namekawa |
| 2017/0271096 | A1* | 9/2017 | Wang .................. H01H 9/0038 |
| 2020/0073466 | A1* | 3/2020 | Walsh .................... G06F 1/263 |

FOREIGN PATENT DOCUMENTS

| | | |
|---|---|---|
| CN | 201766507 U | 3/2011 |
| CN | 105915066 A | 8/2016 |
| CN | 208477328 U | 2/2019 |
| CN | 111049369 A | 4/2020 |
| CN | 214069815 U | 8/2021 |

\* cited by examiner

RESONANT TANK CIRCUIT, WIDE VOLTAGE INPUT/OUTPUT POWER SUPPLY, AND ELECTRONIC DEVICE

CROSS-REFERENCE TO RELATED APPLICATIONS

This application is a national stage entry of International Application No. PCT/CN2021/098828, entitled "RESONANT TANK CIRCUIT, WIDE VOLTAGE INPUT AND OUTPUT POWER SOURCE, AND ELECTRONIC DEVICE" filed on Jun. 8, 2012, which claims priority to Chinese Patent Application No. 202011496918.1, entitled "RESONANT TANK CIRCUIT, WIDE VOLTAGE INPUT/OUTPUT POWER SUPPLY, AND ELECTRONIC DEVICE" filed with the China National Intellectual Property Administration on Dec. 17, 2020, both of which are hereby incorporated by reference in their entireties.

TECHNICAL FIELD

This application relates to the field of power supply control technologies, and in particular, to a resonant tank circuit, a wide voltage input/output power supply, and an electronic device.

BACKGROUND

In current electronic devices, especially in data processing devices for virtual currency, a preparation process of internal chips thereof becomes increasingly advanced, and there are relatively large differences between performance of the chips. Based on this, the same type of chips are further subdivided into more levels, and in this case, different whole sets of equipment manufactured with even the same circuits could require very different operating voltage ranges, and therefore, the operating voltage ranges required by the same type of whole sets of equipment are not necessarily completely the same. Due to differences in the aspects such as circuit design and chip type, different types of whole sets of equipment may require different operating voltage ranges. In this case, in order to meet the requirements of operating voltages of a plurality of devices of the same type and of different types, a power supply needs to be capable of outputting, according to the specific requirement of a device on which the power supply is installed, the operating voltage required by the device.

In the current power supply technology, to take into account efficiency, the efficiency optimization can only be performed in a relatively small voltage range, and when voltage-regulated power supplies of the same type output operating voltages with different magnitudes, there is a relatively large efficiency deviation, and therefore, it is difficult for voltage-regulated power supplies of the same type to meet the requirements of different batches of electronic devices at the same time. Therefore, to take into account the efficiency, the current electronic devices can only use voltage-regulated power supplies of different types according to different designs and materials (such as chips) to ensure that the ranges of the output voltage can ensure the normal operation of the electronic devices. This leads to a problem that there are many types of power supplies and it is difficult to manage them.

In addition to taking into account the range and efficiency of the output voltage, the voltage-regulated power supply also take into account the range of the input voltage, which results in the case that power supplies of the same type cannot be applicable to the power frequency alternating current (AC) power grids with a variety of voltage ranges at the same time, and therefore, power supplies of different types need to be further added to meet the adaptation of the corresponding power frequency AC power grids, which further increases the types and quantity of the power supplies, thereby increasing the difficulty of power supply management and operating costs.

Therefore, it has become a problem to be urgently resolved to provide a power supply that both meets voltage adaptation requirements of power frequency AC power grids and is able to output a wide-range operating voltage to support various operating voltages, so as to ensure that the power supply is applicable to the normal operation of a variety of electronic devices.

SUMMARY

In view of this, embodiments of this application provide a resonant tank circuit, a wide voltage input/output power supply, and an electronic device to meet voltage adaptation requirements of power frequency AC power grids and output a wide-range operating voltage to support various operating voltages, so as to ensure that power supplies of the same type are applicable to normal operation of various electronic devices, thereby reducing the types and quantity of the power supplies, and reducing the difficulty and operating costs of power supply management.

Technical solutions of the embodiments of this application are implemented as follows:

A resonant tank circuit, comprising:
a number-of-turns variable transformer unit, having an input end coil and an output end coil, the input end coil comprising at least two first connection ends and a second connection end, wherein each of the first connection ends is connected to the second connection end through the input end coil, and a number of coil turns between each of the first connection ends and the second connection end is not equal; and
a switch switching unit, having a control end, a first input end, and at least two first output ends, wherein a quantity of the first output ends is equal to a quantity of the first connection ends, and the first output ends are electrically connected to the first connection ends in a one-to-one manner, and the switch switching unit is configured to turn on a circuit connection between the first input end and one of the at least two first output ends according to a control signal received by the control end.

A wide voltage input/output power supply, comprising:
the resonant tank circuit as described above;
a square-wave direct current (DC) generation circuit, electrically connected to the second connection end and the first input end, and configured to be connected to a power frequency alternating current (AC) power grid, adjust an AC power supply of the power frequency AC power grid to a square-wave DC, and output the square-wave DC to the resonant tank circuit;
a rectification circuit, electrically connected to the output end coil, and configured to be connected to a power consumption load, adjust electrical energy outputted by the output end coil to a DC, and output the DC to the power consumption load; and
a control module, electrically connected to the control end, and configured to generate the control signal according to a voltage value of the connected power frequency AC power grid and a preset operating voltage value of the power consumption load.

An electronic device, comprising:
the wide voltage input/output power supply as described above;
a power consumption load, electrically connected to the rectification circuit; and
a load voltage supplying unit, electrically connected to the control module to send a voltage value of the power frequency AC power grid and a preset operating voltage value of the power consumption load to the control module.

It can be seen from the foregoing solutions that the resonant tank circuit, the wide voltage input/output power supply, and the electronic device according to the embodiments of this application can be used to perform wide-range adaptive adjustment according to a voltage value of a power frequency AC power grid and a preset operating voltage value of a power consumption load in a power-on process, and an adjustment method includes: adding a plurality of connection ends to an input end coil of a transformer part, and performing switching between the plurality of connection ends using a switch switching unit to change a turn ratio of the input end coil to an output end coil of the transformer part, so that a required operating voltage of the power consumption load can be converted with a power factor correction (PFC) voltage in the power-on process, thereby realizing the purpose of adjusting the voltage value of the power frequency AC power grid to the operating voltage value of the power consumption load, which ensures the normal operation of the power consumption load after starting up. In the embodiments of this application, the wide voltage range of the power frequency AC power grid and the operating voltage range of a plurality of power consumption loads can be compatible through the setting of the quantity of connection ends of the input end coil and the setting of the turn ratio, which implements the input/output adjustment of the wide voltage range, and therefore, the embodiments of this application can meet the use requirements of the voltage value of the wide-range power frequency AC power grid and the operating voltage value of the power consumption load, which ensures that power supplies of the same type are applicable to the normal operation of various electronic devices, reduces the types and quantity of the power supplies, and reduces the difficulty and operating costs of power supply management.

Figure 1:
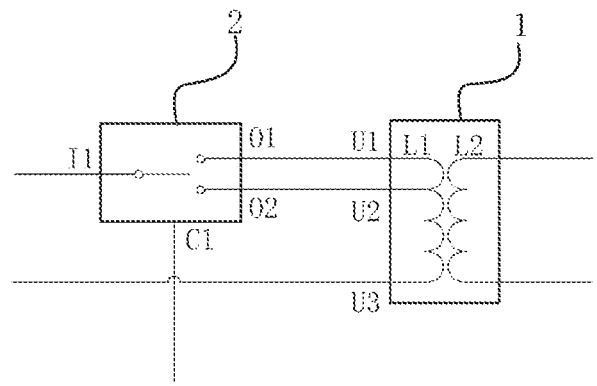
FIG. 1 is a schematic structural diagram of a resonant tank circuit according to an embodiment of this application.

In the accompanying drawings, names of components represented by reference numerals are as follows:
1. Number-of-turns variable transformer unit
L1. Input end coil
L2. Output end coil
U1. First connection end
U2. First connection end
U3. Second connection end
2. Switch switching unit
C1. Control end
I1. First input end
O1. First output end
O2. First output end
10. Resonant tank circuit
20. Square-wave DC generation circuit
21. PFC unit
22. Bridge circuit unit
30. Rectification circuit
40. Control module
50. Power consumption load
60. Load voltage supplying unit

DETAILED DESCRIPTION

To make objectives, technical solutions, and advantages of this application clearer and more understandable, this application is further described in detail below with reference to the accompanying drawings and the embodiments.

An LLC resonant circuit is a resonant circuit that implements constant output voltage by controlling a switch frequency (frequency adjustment), where L is a symbol of inductance and C is a symbol of capacitance. The LLC resonant circuit is widely applied to power supplies of electronic devices, and is generally applied to scenarios with Power Factor Correction (PFC) in front stage. The resonant tank circuit is a part of the LLC resonant circuit, which includes a transformer element. The transformer is an apparatus that uses the principle of electromagnetic induction to change an AC voltage, of which main components are a primary coil (or input end coil), a secondary coil (or output end coil) and an iron core, and of which main functions include voltage transformation, current transformation, impedance transformation, isolation, and the like. The transformer changes the AC voltage by using a turn ratio of the primary coil to the secondary coil.

The LLC resonant circuit generally includes a controller with a metal-oxide-semiconductor field-effect transistor (MOSFET), a resonant network (resonant tank circuit) and a rectification circuit. The controller alternately provides a gate signal for two MOSFETs at a duty ratio of 50%, changes an operating frequency with the change of a load, and adjusts an output voltage, which is referred to as pulse frequency modulation (PFM). In a practical design, the resonant network may be formed by the transformer. The rectification circuit rectifies a sinusoidal waveform generated by the resonant network, and then transmits the rectified sinusoidal waveform to an output stage to supply power to the load.

The transformer uses the turn ratio of the primary coil to the secondary coil to change the AC voltage, and therefore, in the LLC resonant circuit, a relatively smaller voltage range outputted in the front-stage PFC can be achieved by adjustment of the turn ratio of the primary coil to the secondary coil of the transformer, so that a rear-stage DC-DC circuit obtains a wider output voltage range. Based on this, the embodiments of this application provide a resonant tank circuit, a wide voltage input/output power supply, and an electronic device used in a power supply that can implement wide voltage input/output as below.

As shown in FIG. 1, the resonant tank circuit in this embodiment of this application mainly includes a number-of-turns variable transformer unit 1 and a switch switching unit 2. Wherein the number-of-turns variable transformer unit 1 has an input end coil L1 and an output end coil L2, wherein the input end coil L1 includes at least two first connection ends (such as U1 and U2 shown in FIG. 1) and a second connection end U3. Each of the first connection ends is connected to the second connection end U3 through the input end coil L1, and a number of coil turns between each of the first connection ends and the second connection end U3 is not equal. For example, as shown in FIG. 1, a number of coil turns between the first connection end U1 and the second connection end U3 is not equal to a number of coil turns between the first connection end U2 and the second connection end U3, and further, if a turn ratio of the input end coil L1 between the first connection end U1 and the second connection end U3 to the output end coil L2 is referred to as a first turn ratio, and the turn ratio of the input end coil L1 between the first connection end U2 and the second connection end U3 to the output end coil L2 is referred to as a second turn ratio, the first turn ratio is not equal to the second turn ratio.

The switch switching unit 2 has a control end C1, a first input end I1, and at least two first output ends (such as O1 and O2 shown in FIG. 1). A quantity of the first output ends is equal to a quantity of the first connection ends of the input end coil L1, and the first output ends are electrically connected to the first connection ends of the input end coil L1 in a one-to-one manner. For example, as shown in FIG. 1, there are two first output ends and two first connection ends, where the first output end O1 is electrically connected to the first connection end U1, and the second output end O2 is electrically connected to the second connection end U2. The switch switching unit 2 is configured to turn on a circuit connection between the first input end I1 and one of the at least two first output ends according to a control signal received by its control end C1. For example, as shown in FIG. 1, the switch switching unit 2 turns on a circuit connection between the first input end I1 and one of the first output end O1 and the first output end O2 according to a control signal received by its control end C1. The first input end I1 and the second connection end U3 are electrically connected to square-wave DC generation circuit of a front-stage.

In an embodiment, the resonant tank circuit in this embodiment of this application may further include electronic elements such as an inductor and a capacitor, for example, an inductor connected in series between the first input end I1 and the square-wave DC generation circuit of the front-stage, and a capacitor connected in series between the second connection end U3 and the square-wave DC generation circuit of the front-stage.

In an embodiment, the switch switching unit is a relay. In other embodiments, the switch switching unit may alternatively use electronic switch devices such as an MOS (abbreviation for MOSFET) transistor.

As shown in FIG. 1, in an embodiment, there is one input end coil L1, and an end portion of the input end coil L1 is one of the at least two first connection ends. For example, as shown in FIG. 1, an end portion of the input end coil L1 is the first connection end U1, and another end portion of the input end coil L1 is the second connection end U3, and the first connection ends other than the first connection end being an end portion of the input end coil L1 are led out from a middle section of the input end coil L1, for example, as shown in FIG. 1, the first connection end U2 being led out from the middle section of the input end coil L1.

The foregoing resonant tank circuit is used to implement the adjustment and control of a turn ratio of a primary coil to a secondary coil of a number-of-turns variable transformer unit 1, and then adjustment of an output voltage on a side of an output end coil L2 can be implemented by connecting different first connection ends (U1, U2), thereby connecting different first connection ends according to a voltage on a side of an input end coil L1 and the to-be-obtained output voltage on the side of the output end coil L2, so as to implement adjustment of a wide voltage range of the input voltage (such as 220 V to 380 V) and a wide voltage range of the output voltage (such as 12 V to 24 V).

Figure 2:
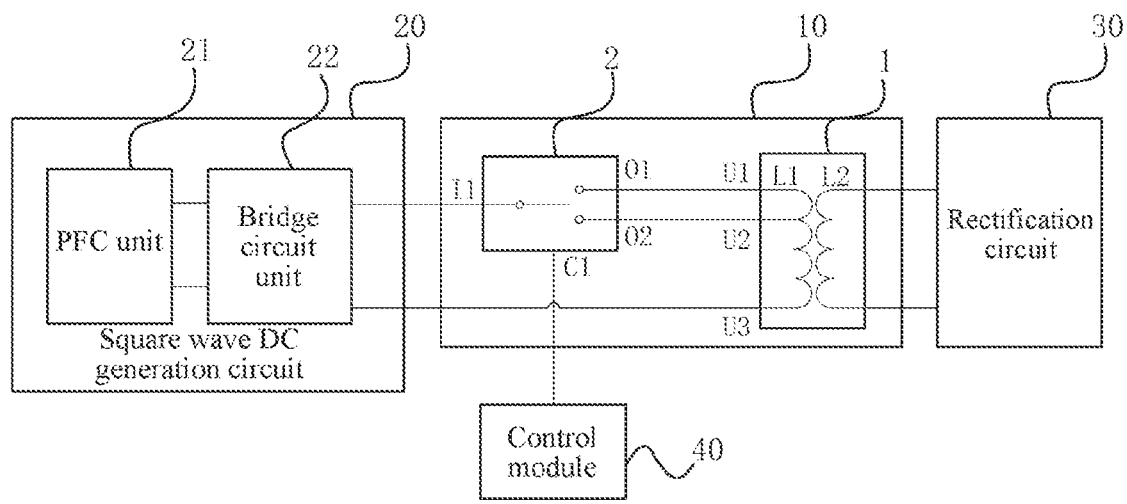
FIG. 2 is a schematic structural diagram of a wide voltage input/output power supply according to an embodiment of this application.

Based on the resonant tank circuit in the foregoing embodiments, an embodiment of this application further provides a wide voltage input/output power supply, as shown in FIG. 2, the wide voltage input/output power supply including a resonant tank circuit 10, a square-wave DC generation circuit 20, a rectification circuit 30, and a control module 40. As shown in FIG. 1, the resonant tank circuit 10 is the resonant tank circuit in the foregoing embodiments. The square-wave DC generation circuit 20 is electrically connected to the second connection end U3 and the first input end I1 in the resonant tank circuit 10, and configured to be connected to a power frequency AC power grid, adjust an AC power supply of the power frequency AC power grid to a square-wave DC, and output the square-wave DC to the resonant tank circuit 10. The rectification circuit 30 is electrically connected to the output end coil L2 in the resonant tank circuit 10, and configured to be connected to a power consumption load, adjust electrical energy outputted by the output end coil L2 to a DC, and output the DC to the power consumption load. The control module 40 is electrically connected to the control end C1 in the resonant tank circuit 10, and configured to generate a control signal according to a voltage value of the connected power frequency AC power grid and a preset operating voltage value of the power consumption load. The rectification circuit 30 may be, for example, a bridge circuit formed by diodes, and details are not described herein again.

In an embodiment, after obtaining the voltage value of the power frequency AC power grid and the preset operating voltage value of the power consumption load, the control module 40 may obtain a turn ratio of the input end coil L1 to the output end coil L2 by looking up a table, while the turn ratio of the input end coil to the output end coil obtained when each of the first connection ends is connected to the second connection end is certain (which has been determined when the number-of-turns variable transformer unit 1 is manufactured), and therefore, the control module 40 can determine which first connection end to be connected (that is, corresponding to the turn ratio of the input end coil to the output end coil) by looking up the table. In an embodiment, information recorded in the queried table may include the voltage value of the power frequency AC power grid, the preset operating voltage value of the power consumption load, and the corresponding first connection end to be connected, as shown in Table 1.

TABLE 1

| Contents of the queried table | | |
|---|---|---|
| Voltage value of power frequency AC power grid | Preset operating voltage value of power consumption load | Corresponding connection end to be connected |
| Z1 | z1 | First connection end U1 |
| Z2 | z2 | First connection end U2 |
| . . . | . . . | . . . |

In Table 1, Z1 and Z2 represent the specific voltage values of the power frequency AC power grid, and z1 and z2 represent the specific preset operating voltage values of the power consumption load.

Transformation from a wide-range input voltage to a wide-range output voltage can be implemented with the wide voltage input/output power supply in the foregoing embodiments. In an actual use case, transformation of the voltage value of the wide-range power frequency AC power grid from 200 V to 300 V to the preset operating voltage value of wide-range the power consumption load from 12 V to 24 V can be implemented, for example, transformation of the voltages such as from 220 V to 12 V, from 220 V to 15 V, from 277 V to 12 V and from 277 V to 15 V can be implemented.

Taking example of the two first connection ends (U1 and U2) shown in FIG. 1, a ratio of turns between the first connection end U1 and the second connection end U3 to turns between the first connection end U2 and the second connection end U3 is set to 17:15, and a ratio of turns between the first connection end U1 and the second connection end U3 to turns of the output coil is set to 16:1, then for a power consumption load with an operating voltage value of about 12 V, connecting to the first connection end U1 or the second connection end U2 through the control signal can result in the power supply being in an optimal efficiency point when connected to a power frequency AC power grid of 277 V or 220 V. Therefore, by adding more first connection ends and corresponding turn ratios (including the ratio of turns between each of the first connection ends and the second connection end to the turns of the output coil), power frequency AC power grids with various voltage values and power consumption loads with various operating voltage values can be compatible.

As shown in FIG. 2, in an embodiment, the square-wave DC generation circuit 20 includes a PFC unit 21 and a bridge circuit unit 22. Wherein the PFC unit 21 is configured to be connected to the power frequency AC power grid and adjust an AC of the power frequency AC power grid to a DC. The bridge circuit unit 22 is electrically connected between the PFC unit 21 and the resonant tank circuit 10, and configured to adjust the DC outputted by the PFC unit 21 to a square-wave DC and output the square-wave DC to the resonant tank circuit 10. Wherein the bridge circuit unit 22 may include a full bridge circuit and/or a half bridge circuit.

Figure 3:
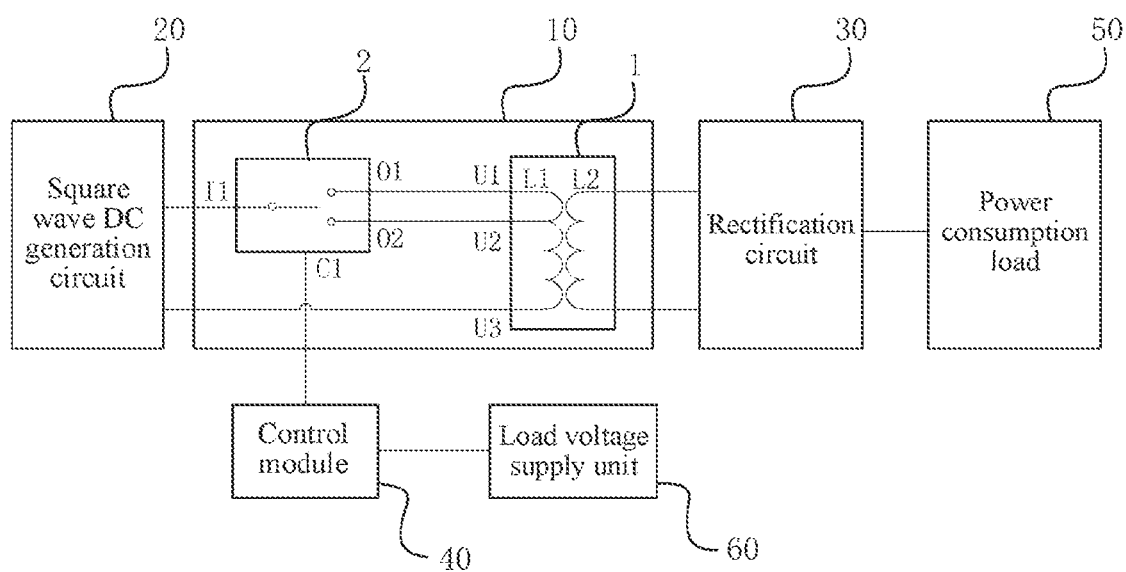
FIG. 3 is a schematic structural diagram of an electronic device according to an embodiment of this application.

As shown in FIG. 3, an embodiment of this application further provides an electronic device, including the wide voltage input/output power supply, a power consumption load 50, and a load voltage supplying unit 60 described in the foregoing embodiments. The power consumption load 50 is electrically connected to the rectification circuit 30. The load voltage supplying unit 60 is electrically connected to the control module 40 to send the voltage value of the power frequency AC power grid and the preset operating voltage value of the power consumption load to the control module 40.

In a specific embodiment, the electronic device is a data processing device for virtual currency, where the power consumption load 50 is a hashboard, and the load voltage supplying unit 60 is a control board. The data processing device in this application may be, for example, a virtual currency mining machine.

Figure 4:
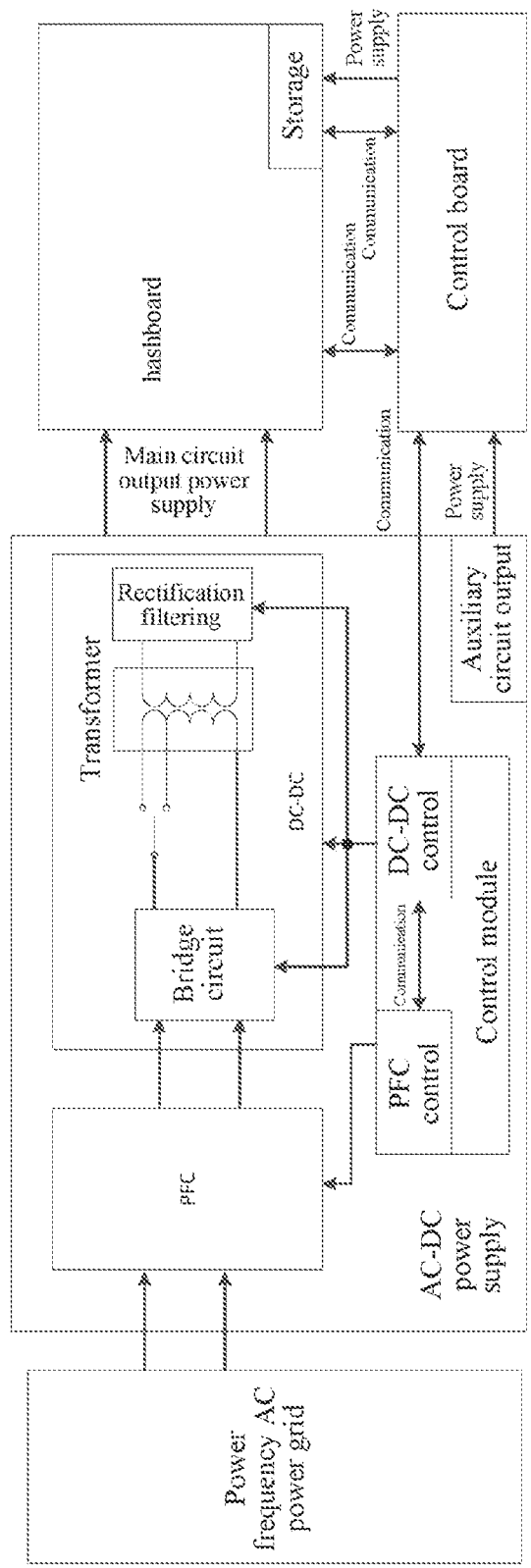
FIG. 4 is a circuit block diagram of a data processing device using a wide voltage input/output power supply according to an embodiment of this application.

FIG. 4 is a circuit block diagram of a data processing device using the wide voltage input/output power supply according to this embodiment of this application. The wide voltage input/output power supply is the part of the AC-DC power supply in FIG. 4. Wherein the control board is connected with the hashboard in communication. The hashboard is provided with a non-volatile memory (storage) configured to store a performance parameter of the hashboard, and the preset operating voltage value of the hashboard is included in the performance parameter. The control board obtains the preset operating voltage value of the hashboard by reading the performance parameter in the non-volatile memory (storage).

In an embodiment, the performance parameter of the hashboard may be a type of the hashboard, where the type directly corresponds to performance of the hashboard or a performance identifier is stored in the type in an agreed format. In an embodiment, the control board obtains the preset operating voltage value of the hashboard based on the type of the hashboard, wherein in an example, the performance parameter of the hashboard includes the preset operating voltage value of the hashboard, and in another example, the performance parameter of the hashboard does not include the preset operating voltage value of the hashboard, instead, the preset operating voltage value of the hashboard corresponding to the performance parameter of the hashboard is stored in the control board.

Further, in an embodiment, as shown in FIG. 4, the wide voltage input/output power supply (AC-DC power supply) further includes a control board power supply circuit (which is an auxiliary circuit output in FIG. 4). The control board power supply circuit (auxiliary circuit output) is electrically connected to the control board, and configured to be connected to the power frequency AC power grid and supply power to the control board. It should be noted that the control board power supply circuit is a separate power supply with a separate transformer, and due to the relatively small power, the control board power supply circuit may not operate at an optimal efficiency point, but the loss ratio thereof is not large, and therefore, the control board power supply circuit has no problem in functions, while its efficiency is not optimal, however, the efficiency of the control board power supply circuit only occupies a small share in the overall power efficiency, and thus the overall power efficiency will not be affected.

Further, in an embodiment, as shown in FIG. 4, the control module in the wide voltage input/output power supply (AC-DC power supply) is configured to control various parts of the AC-DC power supply, including a PFC unit and a DC-DC unit. Wherein the control on the PFC unit is implemented by a PFC control part in the control module, and the control on the DC-DC unit is implemented by a DC-DC control part. The bridge circuit unit, the resonant tank circuit, and rectification filtering (or the rectification circuit) part form the DC-DC unit together, and the DC-DC control part in the control module implements the control on the bridge circuit unit and the rectification filtering respectively. Meanwhile, the DC-DC control part in the control module is also configured to implement the control of the switch switching unit in the resonant tank circuit.

As shown in FIG. 4, the PFC unit and the bridge circuit form the square-wave DC generation circuit described in the foregoing embodiments.

There are many actual functions of the PFC unit, including front-stage filtering, rectification filtering, voltage boosting, and the like after a power frequency AC is connected, and finally a high-voltage DC is outputted. The DC-DC behind the PFC unit converts the high-voltage DC outputted by the PFC unit into a high-voltage pulse through control of the switches, converts the high-voltage pulse into a low-voltage pulse through a transformer, and then converts the low-voltage pulse into a low-voltage DC through the rectification filtering on a rear side. The auxiliary circuit output is the power supply of the control board, which is turned on by default when powered on. The control board starts after being powered on, and supplies power to a storage unit on the hashboard, while reads information in the storage unit, obtains a type of the hashboard, finds out a corresponding main circuit voltage value, and sends the required configuration information to the control module of the power supply. The control module controls the switch switching unit according to the information provided by the control board to switch the number-of-turns variable transformer unit to a required turn ratio, and then the control board sends a start-up instruction when necessary, and the voltage turns on the main circuit output voltage.

An embodiment of this application further provides a wide voltage input/output method, which is applied to the data processing device in the foregoing embodiments, and the wide voltage input/output method mainly includes the following steps:

Step a1: The control board power supply circuit (auxiliary circuit output) is powered on, and the control board of the data processing device starts and reads the nonvolatile memory (storage) of the hashboard to obtain the preset operating voltage value of the hashboard.

Step a2: The control board generates configuration information according to the preset operating voltage value of the hashboard and sends the configuration information to the control module of an AC-DC power supply.

Step a3: The control module of the AC-DC power supply controls the switch switching unit to connect to the corresponding first connection end according to the configuration information sent by the control board.

Step a4: The control board sends a start-up instruction to the control module of the AC-DC power supply, where under the control of the control module, the PFC unit is connected to the power frequency AC power grid for power supply, and obtains, through the bridge circuit, the resonant tank circuit, and the rectification filtering, a DC that drives the hashboard to operate to drive the hashboard to be powered on.

Step a5: The hashboard operates under a DC power supply voltage outputted by the rectification circuit.

The resonant tank circuit, the wide voltage input/output power supply, and the electronic device according to the embodiments of this application can be used to perform wide-range adaptive adjustment according to a voltage value of a power frequency AC power grid and a preset operating voltage value of a power consumption load in a power-on process, wherein an adjustment method includes: adding a plurality of connection ends to an input end coil of a transformer part, and performing switching between the plurality of connection ends using a switch switching unit to change a turn ratio of the input end coil to an output end coil of the transformer part, so that in the power-on process, the voltage value of the power frequency AC power grid can be adjusted to the operating voltage value of the power consumption load, which ensures the normal operation of the power consumption load after starting up. In the embodiments of this application, the voltage values of a plurality of power frequency AC power grids and the operating voltage values of a plurality of power consumption loads can be compatible through the setting of the quantity of connection ends of the input end coil and the setting of the turn ratio, which implements the input/output adjustment of the wide voltage range, and therefore, the embodiments of this application can meet the use requirements of the voltage value of the wide-range power frequency AC power grid and the operating voltage value of the power consumption load, which ensures that power supply of the same type is applicable to the normal operation of various electronic devices, reduces the types and quantity of the power supplies, and reduces the difficulty and operating costs of power supply management.

The foregoing descriptions are merely the embodiments of this application, but are not intended to limit this application, and any modification, equivalent replacement, or improvement made within the spirit and principle of this application shall fall within the protection scope of this application.

What is claimed is:

1. An electronic device, comprising:
a wide voltage input/output power supply, comprising:
a resonant tank circuit, comprising:
a number-of-turns variable transformer unit, having an input end coil and an output end coil, the input end coil comprising at least two first connection ends and a second connection end, wherein each of the first connection ends is connected to the second connection end through the input end coil, and a number of coil turns between each of the first connection ends and the second connection end is not equal; and
a switch switching unit, having a control end, a first input end, and at least two first output ends, wherein a quantity of the first output ends is equal to a quantity of the first connection ends, and the first output ends are electrically connected to the first connection ends in a one-to-one manner, and the switch switching unit is configured to turn on a circuit connection between the first input end and one of the at least two first output ends according to a control signal received by the control end;
a square-wave direct current (DC) generation circuit, electrically connected to the second connection end and the first input end, and configured to be connected to a power frequency alternating current (AC) power grid, adjust an AC power supply of the power frequency AC power grid to a square-wave DC, and output the square-wave DC to the resonant tank circuit;
a rectification circuit, electrically connected to the output end coil, and configured to be connected to a power consumption load, adjust electrical energy outputted by the output end coil to a DC, and output the DC to the power consumption load; and
a control module, electrically connected to the control end, and configured to generate the control signal according to a voltage value of the connected power frequency AC power grid and a preset operating voltage value of the power consumption load;
the power consumption load, electrically connected to the rectification circuit; and
a load voltage supplying unit, electrically connected to the control module to send a voltage value of the power frequency AC power grid and a preset operating voltage value of the power consumption load to the control module,
wherein the electronic device is a data processing device for virtual currency, the power consumption load is a hashboard, and the load voltage supplying unit is a control board,
wherein
the control board is connected with the hashboard in communication;
the hashboard is provided with a non-volatile memory configured to store a performance parameter of the hashboard, and the preset operating voltage value of the hashboard is comprised in the performance parameter; and the control board obtains the preset operating voltage value of the hashboard by reading the performance parameter in the non-volatile memory.

2. The electronic device according to claim 1, wherein the wide voltage input/output power supply further comprises:

a control board power supply circuit, electrically connected to the control board, and configured to be connected to the power frequency AC power grid and supply power to the control board.

3. The electronic device according to claim 1, wherein the switch switching unit is a relay.

4. The electronic device according to claim 1, wherein there is one input end coil;

an end portion of the input end coil is one of the at least two first connection ends;

another end portion of the input end coil is the second connection end; and the first connection ends other than the first connection end being the end portion of the input end coil are led out from a middle section of the input end coil.

5. The electronic device according to claim 1, wherein the square-wave DC generation circuit comprises:

a power factor correction (PFC) unit, configured to be connected to the power frequency AC power grid and adjust an AC of the power frequency AC power grid to a DC; and a bridge circuit unit, electrically connected between the PFC unit and the resonant tank circuit, and configured to adjust the DC outputted by the PFC unit to a square-wave DC and output the square-wave DC to the resonant tank circuit.

* * * * *